United States Patent [19]

Artaud et al.

[11] 4,351,794
[45] Sep. 28, 1982

[54] FAST NEUTRON REACTOR

[75] Inventors: Robert Artaud, Aix en Provence; Michel Aubert, Manosque; Charley Renaux, Jouques, all of France

[73] Assignee: Commissariat a l'Energie Atomique, Paris, France

[21] Appl. No.: 134,898

[22] Filed: Mar. 28, 1980

[30] Foreign Application Priority Data

Apr. 6, 1979 [FR] France .................... 79 08793

[51] Int. Cl.³ ............................. G21C 15/00
[52] U.S. Cl. .................... 376/404; 376/290; 376/292; 376/405; 376/461
[58] Field of Search .............. 176/40, 38, 65, 87, 176/62, 63; 376/404, 290, 292, 405, 461

[56] References Cited

U.S. PATENT DOCUMENTS

| 3,784,443 | 1/1974 | Vercasson | 176/62 |
| 3,962,032 | 6/1976 | Berniolles et al. | 176/65 |
| 3,992,256 | 11/1976 | Lleres et al. | 176/38 |
| 4,043,866 | 8/1977 | Durston | 176/65 |
| 4,056,438 | 11/1977 | Gama et al. | 176/65 |
| 4,219,385 | 8/1980 | Guidez et al. | 176/87 |
| 4,259,156 | 3/1981 | Neuenfeldt et al. | 176/65 |

FOREIGN PATENT DOCUMENTS

| 2133410 | 1/1972 | Fed. Rep. of Germany | 176/65 |
| 2335378 | 2/1977 | Fed. Rep. of Germany | |
| 1593957 | 6/1970 | France | 176/65 |
| 2133530 | 10/1972 | France | |
| 2337408 | 7/1977 | France | |
| 2346816 | 10/1977 | France | |
| 2370344 | 7/1978 | France | 176/65 |

Primary Examiner—Harvey E. Behrend

[57] ABSTRACT

Fast neutron nuclear reactor cooled by a liquid metal, comprising a main vessel sealed by an upper slab and within said main vessel at least one heat exchanger between the said liquid metal and a second fluid, at least one pump for circulating the liquid metal, a cylindrical inner vessel with a vertical axis and placed on flooring resting on the bottom of the main vessel, the inner vessel containing the reactor core which rests on a support bearing against the bottom of the main vessel by means of the said flooring, the liquid metal circulating from bottom to top through the reactor core, wherein the said inner vessel incorporates an internal baffle which revolves about the vertical axis of the inner vessel, said baffle comprising an upper cylindrical part adjacent to the inner vessel and arranged above the core, and a lower cylindrical part surrounding the core and having a smaller diameter than the upper part, said lower part being connected to the upper part by a frustum-shaped part, whereby the baffle confines the "hot" liquid metal leaving the core and at least one pipe is arranged between the frustum-shaped part of the baffle and at least one heat exchanger for connecting the intake of the latter to the inner volume defined by the baffle.

8 Claims, 5 Drawing Figures

FAST NEUTRON REACTOR

BACKGROUND OF THE INVENTION

The present invention relates to a fast neutron nuclear reactor of the type having a cylindrical inner vessel.

More specifically, the present invention relates to a fast neutron nuclear reactor of the integrated type and which is more particularly cooled by a liquid metal such as liquid sodium or other equivalent liquid metals.

It is known that in fast neutron nuclear reactors of the integrated type cooled by a liquid metal, the known vessel containing the liquid cooling metal, contains an inner vessel, whose main function is to separate on the one hand the hot sodium leaving the core of the reactor contained in the inner vessel and on the other the cold sodium leaving the exchangers disposed in the annular space between the inner vessel and the main vessel.

Various inner vessel arrangements have been proposed to bring about this separation. Reference is firstly made to so-called ridged inner vessels in which the ridge, traversed by the intermediate exchangers, makes it possible to separate the exchanger intake which is supplied by the sodium from the core and the exchanger outlet which issues into the annular space containing the primary pumps.

Another solution consists of using a generally cylindrical inner vessel. In this case, pipes connect the interior of the inner vessel above the core to the intake of the intermediate exchangers, which are themselves surrounded by a collar or ferrule.

This type of reactor is in particular described in French patent application No. 75 39982 of Dec. 29, 1975 in the name of the present Applicant. In the case of this type of inner vessel, there is an annular space between the external periphery of the core or more specifically its lateral neutron protection and the inner part of the inner vessel. In this annular space, there are convection movements of the hot sodium leaving the core and which can be prejudicial to the mechanical behaviour of structures such as the girder or support which supports the core and the flooring on which said girding or support rests. Thus, problems are encountered in the heating of such structures and it is necessary to provide means for preventing convection movements.

Another disadvantage of such a design is that the pipe which guides the hot liquid metal between the interior of the inner vessel and the heat exchangers are directly fixed to the inner vessel. The hot liquid metal flow in such pipes leads to vibrations, which are thus transmitted to the assembly constituted by the inner vessel and its support.

BRIEF SUMMARY OF THE INVENTION

The present invention relates to a nuclear reactor of the type described hereinbefore in which the above-mentioned disadvantages do not occur and in which in particular an annular zone is not created around the core and in which a rigid connection is formed between the inner vessel and each exchanger.

The present invention therefore relates to a fast neutron nuclear reactor cooled by a liquid metal, comprising a main vessel sealed by an upper slab and within said main vessel at least one heat exchanger between the said liquid metal and a second fluid, at least one pump for circulating the liquid metal, a cylindrical inner vessel with a vertical axis and placed on flooring resting on the bottom of the main vessel, the inner vessel containing the reactor core which rests on a support bearing against the bottom of the main vessel by means of the said flooring, the liquid metal circulating from bottom to top through the reactor core, wherein the said inner vessel incorporates an internal baffle which revolves about the vertical axis of the inner vessel, said baffle comprising an upper cylindrical part adjacent to the inner vessel and arranged above the core, and a lower cylindrical part surrounding the core and having a smaller diameter than the upper part, said lower part being connected to the upper part by a frustum-shaped part, whereby the baffle confines the "hot" liquid metal leaving the core and at least one pipe is arranged between the frustum-shaped part of the baffle and at least one heat exchanger for connecting the intake of the latter to the inner volume defined by the baffle.

BRIEF DESCRIPTION OF THE DRAWINGS

The invention is described in greater detail hereinafter relative to non-limitative embodiments of the invention and with reference to the attached drawings, wherein show.

DETAILED DESCRIPTION OF THE PREFERRED EMBODIMENTS

Figure 1:
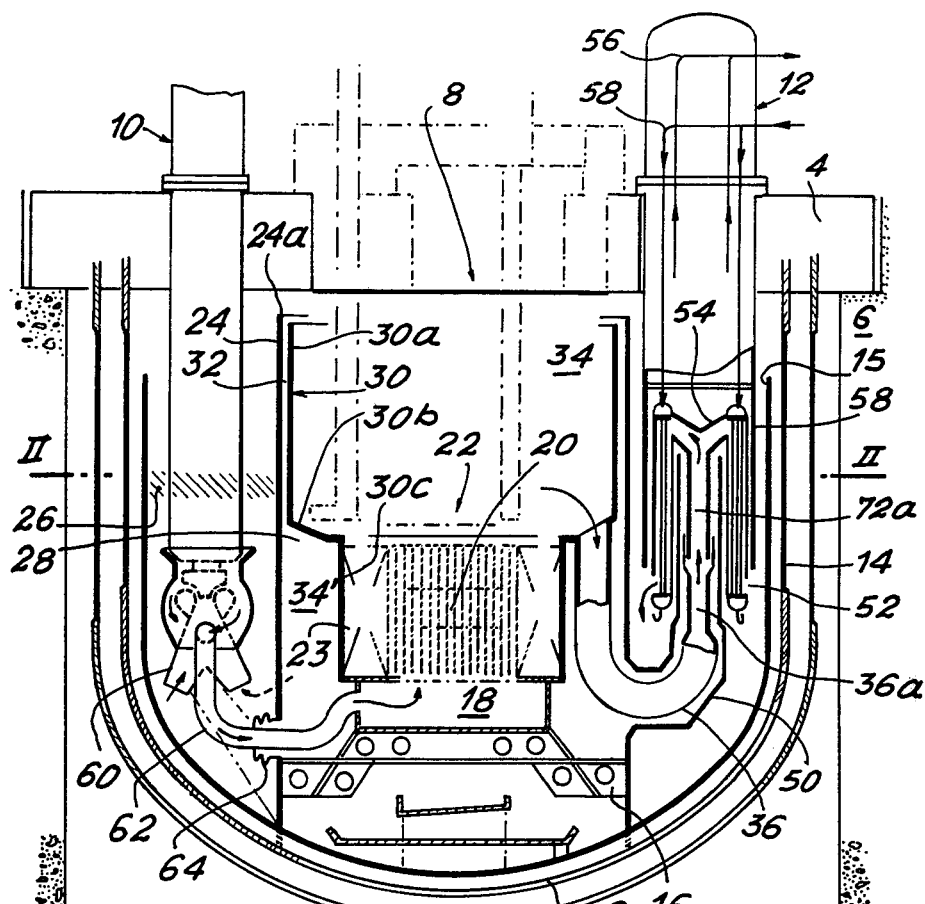
FIG. 1 a vertical sectional view of the nuclear reactor showing a pump and in intermediate exchanger.
Figure 2:
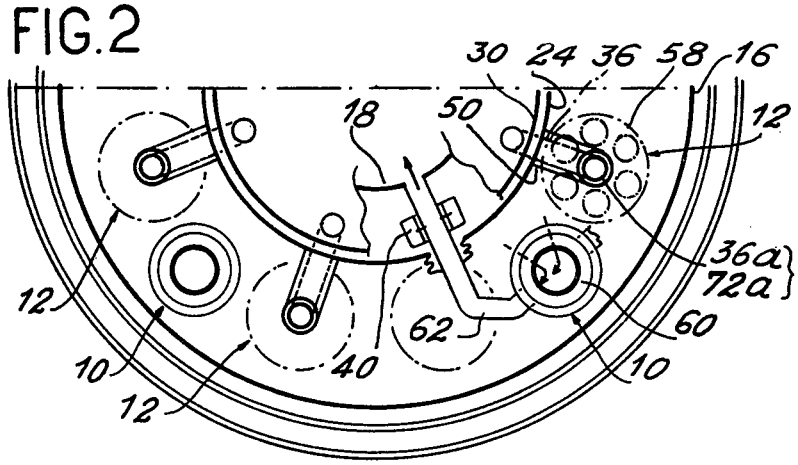
FIG. 2 a horizontal sectional view in accordance with the line II—II of FIG. 1.

FIG. 1 shows the nuclear reactor according to the invention. In per se known manner, the main vessel 2 is suspended on the upper sealing slab 4, which itself rests on the confining member 6. Slab 4 has a system of eccentric rotary plugs 8. Slab 4 also serves to support the primary pumps 10 and the intermediate exchangers 12 and these members are described in greater detail hereinafter. The main vessel 2 is externally duplicated by a safety vessel 14, which is also suspended on the sealing slab 4. Finally, there is a baffle 15 fixed to the main vessel 2 and which serves to ensure in per se known manner a cooling of the main vessel 2 and in particular the upper part thereof.

The main vessel 2 contains a flooring 16 supported by the main vessel 2 and this flooring serves to support the support member or girder 18 and also the false-support into which are respectively fitted the fuel or fertile assemblies 22 constituting the core 22 of the reactor and the elements forming the latter neutron protection 23 of the core. These elements are for example constituted by wound metal rods which form a number of rings around the core, the rods being staggered. Flooring 16 also serves to support the cylindrical inner vessel 24. It should be noted that the upper edge 24a of inner vessel 24 is free.

Thus, inner vessel 24 separates the space defined by the main vessel 2 into an annular zone 26 in which are mainly located the primary pumps 10 and the intermediate exchangers 12 and an internal and generally cylindrical space 28 containing the core. Annular space 26 exclusively contains a liquid metal, which is termed cold. According to the invention, space 28 contains a baffle, designated by the general reference numeral 30 and which comprises an upper cylindrical part 30a coaxial to the inner vessel 24 and defining with the latter an annular space 32 of reduced thickness, a generally frustum-shaped part 30b and a further cylindrical part with a vertical axis 30c which surrounds the lateral neutron protection 23 to rest on support 18 in the variants shown in the drawings. The thus defined baffle 30 separates within the inner space 28 of inner vessel 24 a hot sodium zone 34 which is entirely positioned above the reactor core 22, i.e. above the hot liquid metal outlet and a space 34' between baffle 30 and inner vessel 24.

Pipes 36 connect the frustum-shaped part 33 of inner baffle 30 to the heat exchangers 12 for supplying the latter with hot liquid metal. These pipes are generally U-shaped and issue into the lower part of the supply duct 72a of the heat exchanger, whilst surrounding said duct over part of its length.

Figure 3:
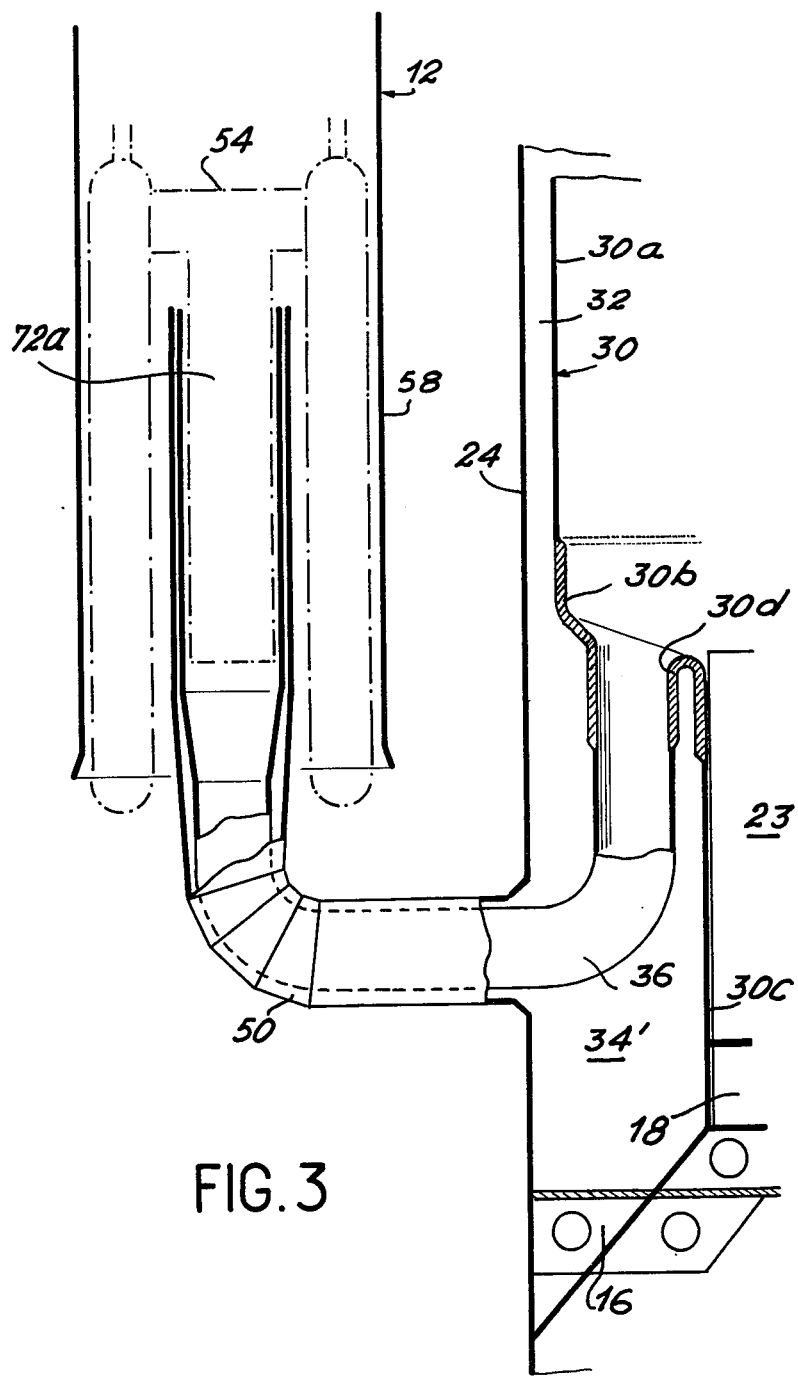
FIG. 3 a larger scale sectional view illustrating a first variant of the invention.

In the first constructional variant of the invention shown in FIGS. 1 and 3, pipes 36 are constructed in one piece and are integral with the frustum-shaped parts 30b of baffle 30. The wall preferably has a reinforcement 30b level between the junction between the baffle and each of the pipes. In this case, the pipes 36 are supported by means of baffle 30, which rests on the support 18. According to a not shown variant, the baffle 30 could also rest directly on the flooring 16.

Figure 4:
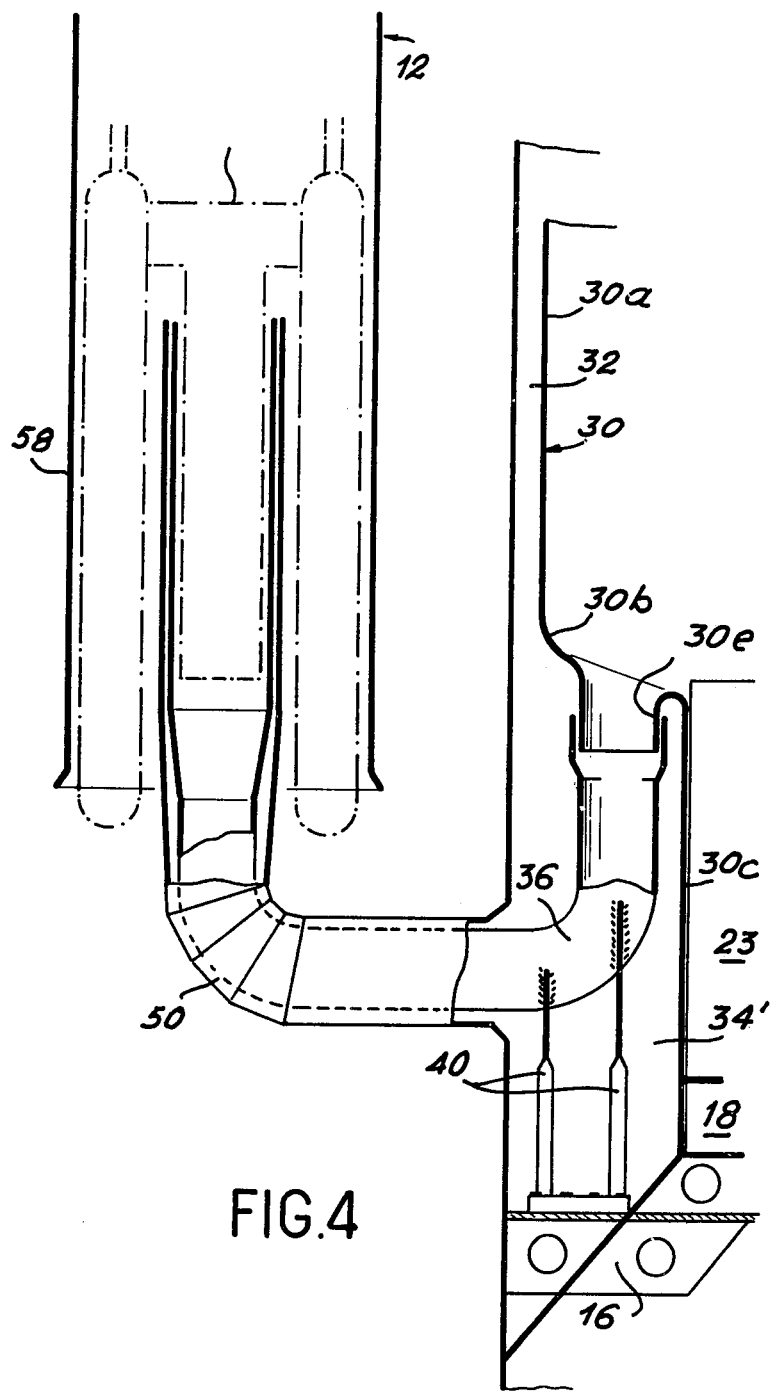
FIG. 4 a view comparable to FIG. 3 illustrating a second variant of the invention.

According to a second constructional variant of the invention shown in FIG. 4, pipes 36 are independent of baffle 30. The latter then has, in its frustum-shaped part 33b connecting pieces 30e into which are fitted the pipes 36. Pipes 36 are supported independently of baffle 30 by supporting devices 40, whose lower part is integral with the flooring 16. Although not indispensible due to the supporting of pipes 36 by baffle 30, supporting devices like devices 40 can also be used in the first variant of FIG. 3.

In all cases, it is important to note that the upper end 36a of pipes 36 is not fixed to the corresponding heat exchanger 12. Thus, under the effect of the thermal expansions due to the differing temperatures of the liquid cooling metal, the assembly constituted by baffle 30 and pipes 36 can be freely displaced and at the same time, pipes 36 can move freely with respect to exchangers 12. In connection with the heat exchangers 12, it is pointed out that they can be of any annular or modular type. In all cases, a pneumatic sealing (without mechanical connection) is made between each pipe 36 and the corresponding exchanger 12.

It is also important to note that baffle 30 bearing in mind its arrangement, confines within the inner vessel 24 the hot liquid metal leaving the reactor core above the latter. This means that there is no longer a circulation of hot sodium in the annular space between the lateral periphery of the reactor core 22 and the inner vessel (space 34'). Thus, there is no longer any need to provide special means for preventing liquid metal convection movements occurring in this region, because there is no possibility of the hot liquid metal coming into contact with the support member 18 of the core support. Thus, the problems linked with the heating of said support are eliminated.

In order to complete the description of the nuclear reactor according to the invention, it is pointed out that the inner vessel 24 is preferably extended by sleeves such as 50 which surrounds the pipes 36 for supplying the heat exchangers with hot liquid metal. Thus, this construction brings about an improvement in the thermal insulation between the interior of pipes 36 supplying the hot liquid metal and the annular space 26 between the vessels containing the cold liquid metal. It is also pointed out that the annular space 34' between baffle 30 and inner vessel 24 is filled with a liquid metal at an intermediate temperature, ensuring a certain thermal insulation between the hot liquid metal in space 34 defined by baffle 30 and the cold liquid metal filling the annular space 26. Pipes 56 and 58 indicate the outlet and inlet for the secondary fluid circulating in exchanger 12. The outlet of the primary liquid metal takes place in the space 26 between the vessels below the ferrule 58 surrounding each heat exchanger. The exchanger shown is a modular exchanger of the type described in French patent application No. 77 08384 filed on Mar. 21, 1977. The exchanger is constituted by a plurality of exchange modules arranged on a ring within an outer envelope. It is also possible to use an annular exchanger as described in French patent application No. 76 09082 filed on Mar. 29, 1976.

The cold liquid metal leaving the heat exchangers is taken up by the intake nozzles 60 of primary pumps 10. The outlet of the primary pumps is connected to support 18 by connecting pieces 62 which transverse the lower part of the inner vessel 24. Sealing between the cold liquid metal in the space 26 and the liquid metal at intermediate temperature at annular space 28 is provided by sealing bellows such as 64.

The primary cooling metal circuit in the present reactor is readily apparent from what has been stated hereinbefore. On traversing reactor core 22, the liquid metal is heated and enters the space 34 defined by baffle 30. This hot liquid metal is taken up by pipes 36 and then enters the heat exchangers 12. In the exchangers, it gives off its heat to the secondary fluid and leaves in cooled form and passes into the space 26 between the vessels. It is then sucked in by intake nozzle 60 of pumps 10 and is delivered by ducts 62 to support 18 from where it passes through the reactor core once again.

Figure 5:
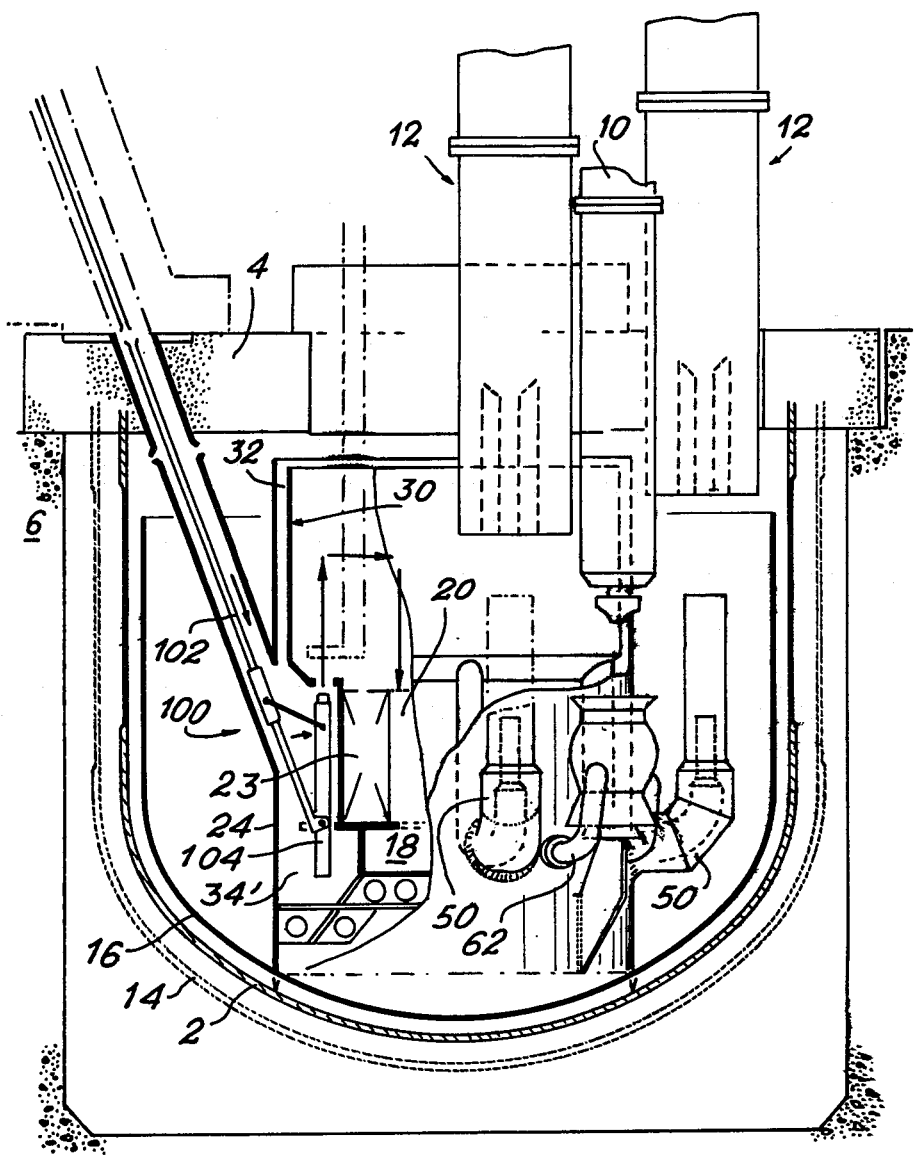
FIG. 5 a vertical sectional view of the nuclear reactor showing the inner part of the device for handling the assemblies.

FIG. 5 shows the internal part 100 of the device for handling the assemblies constituting the reactor core. As is known in certain fast neutron reactors of the integrated type, this device essentially comprises a handling ramp 102 and a handling tank 104. The bottom of the handling ramp emerges into space 34' between the inner vessel 24 and the neutron protection 23 and the handling tank is also located in this space.

It is apparent that as a result of the arrangements according to the invention, the handling device is housed very easily and rationally.

As can be gathered from the description, the features of the invention lead to numerous advantages compared with the prior art nuclear reactors with internal cylindrical vessels. The inner vessel supporting the pressure difference due to pressure losses is strictly cylindrical and mechanically more easily absorbs these stresses. The inner baffle 30 revolves and is free in expansion, which is advantageous for the absorption of the various mechanical stresses, due more particularly to thermal expansion.

The device for handling the assemblies is naturally inserted between the inner vessel 24 and the baffle 30, without it being necessary to provide additional means due to the passage through the baffle.

The volume of the hot liquid metal collector is reduced to the minimum, because it is limited to the volume of zone 34 defined by baffle 30. Thus, the hot zone is confined. The thermal protection of support 18 and flooring 16 is brought about by this confinement of the hot liquid metal in zone 34 and by the arrangement of the ducts 62 for delivering the cold liquid metal to the support 18.

Finally, when the supporting devices 40 support the hot liquid metal discharge pipe 36, said devices make it possible to limit the problems due to the vibrations produced by the flow of the hot liquid metal in the said pipes 36 and ensure a better behaviour in the case of earthquakes.

What is claimed is:

1. A fast neutron reactor cooled by a liquid metal, comprising: a main vessel sealed by an upper slab and having a bottom, and within said main vessel, a cylindrical inner vessel with a vertical axis and placed on flooring resting on the bottom of the main vessel, at least one heat exchanger between said liquid metal and a second fluid, and at least one pump for circulating the liquid metal being located in an annular space defined between the main vessel and the inner vessel, the inner vessel containing the reactor core which rests on a support bearing against the bottom of the main vessel by means of said flooring, the liquid metal circulating from bottom to top through the reactor core, wherein said reactor further comprises an internal baffle which is located within and spaced from said inner vessel and which revolves about the vertical axis of the inner vessel, said baffle comprising an upper cylindrical part adjacent to the inner vessel and arranged above the core, and a lower cylindrical part surrounding the core and having a smaller diameter than the upper part, said lower part being connected to the upper part by a frustum-shaped part, whereby the baffle confines the "hot" liquid metal leaving the core entirely above the latter and at least one pipe being arranged between the frustum-shaped part of the baffle and at least one heat exchanger for connecting the intake of the latter to the inner volume defined by the baffle.

2. A nuclear reactor according to claim 1, wherein the internal baffle rests on the base of the main vessel via one of the two support means constituted by the support and the flooring.

3. A nuclear reactor according to claim 2, wherein the pipe is made in one piece and is fixed to the frustum-shaped part of the baffle.

4. A nuclear reactor according to claim 2, wherein the frustum-shaped part of the baffle is provided with at least one connecting piece to which is fitted the pipe, the latter being supported by at least one supporting member resting on the bottom of the main vessel via one of the two support means constituted by the support and the flooring.

5. A nuclear reactor according to claim 1, wherein each pipe is connected to the intake of an exchanger by means of a pneumatic sealing connection.

6. A nuclear reactor according to claim 1, wherein each heat exchanger is of a modular exchanger.

7. A nuclear reactor according to claim 1, wherein each heat exchanger is of annular.

8. A nuclear reactor according to claim 1, comprising a device for handling core assemblies, said device incorporating a transfer ramp traversing the slab and the inner vessel, said ramp emerging in the space between the inner vessel and the baffle, said space serving to house a handling tank for the assemblies.

* * * * *